United States Patent
Böhm

(10) Patent No.: US 9,797,501 B2
(45) Date of Patent: Oct. 24, 2017

(54) DELIVERY DEVICE FOR DELIVERING OIL FROM A RESERVOIR TO A TRANSMISSION OF A MOTOR VEHICLE

(71) Applicant: Continental Automotive GmbH, Hannover (DE)

(72) Inventor: Christian Böhm, Frankfurt am Main (DE)

(73) Assignee: Continental Automotive GmbH, Hannover (DE)

( * ) Notice: Subject to any disclaimer, the term of this patent is extended or adjusted under 35 U.S.C. 154(b) by 130 days.

(21) Appl. No.: 14/899,488

(22) PCT Filed: May 28, 2014

(86) PCT No.: PCT/EP2014/061071
§ 371 (c)(1),
(2) Date: Dec. 17, 2015

(87) PCT Pub. No.: WO2014/202366
PCT Pub. Date: Dec. 24, 2014

(65) Prior Publication Data
US 2016/0146331 A1    May 26, 2016

(30) Foreign Application Priority Data

Jun. 18, 2013  (DE) .......................... 10 2013 211 428
Jul. 4, 2013    (DE) .......................... 10 2013 213 051

(51) Int. Cl.
*F16H 57/04*  (2010.01)
*F01C 21/10*  (2006.01)
(Continued)

(52) U.S. Cl.
CPC ......... *F16H 57/0436* (2013.01); *F01C 21/10* (2013.01); *F04B 17/06* (2013.01);
(Continued)

(58) Field of Classification Search
CPC ...... F16H 57/0436; F01C 21/10; F04B 17/06; F04C 2/10; F04C 2/344; F04C 2240/30
See application file for complete search history.

(56) References Cited

U.S. PATENT DOCUMENTS

2007/0148011 A1*  6/2007  Schulz-Andres ....... F01C 21/10
                                                            417/279
2014/0286801 A1    9/2014  Böhm
(Continued)

FOREIGN PATENT DOCUMENTS

DE         197 50 675       8/1998
DE      10 2004 005 430     8/2005
(Continued)

OTHER PUBLICATIONS

German translation of an Office Action dated Nov. 7, 2016 which issued in the corresponding Japanese Patent Application No. 2016-520351.

*Primary Examiner* — William E Dondero
*Assistant Examiner* — Robert T Reese
(74) *Attorney, Agent, or Firm* — Cozen O'Connor

(57) ABSTRACT

A pumping device for pumping oil from a reservoir to a transmission of a motor vehicle includes: an oil pump, selectively drivable either by a mechanical direct drive or an activatable electric drive. The oil pump has: first and second components, the first and second components being movable relative to one another and being configured to deliver the oil, the mechanical direct drive being connected to one of the first and second components, and the activatable electric drive being connected to the other of the first and second components; a pump stage housing, in which the first and second components are arranged, the pump stage housing having two control disks and an interposed ring; and a pot-shaped component in which the pump stage housing is arranged.

19 Claims, 4 Drawing Sheets

(51) Int. Cl.
  *F04B 17/06* (2006.01)
  *F04C 2/10* (2006.01)
  *F04C 2/344* (2006.01)

(52) U.S. Cl.
  CPC ............... *F04C 2/10* (2013.01); *F04C 2/344* (2013.01); *F04C 2240/30* (2013.01)

(56) References Cited

U.S. PATENT DOCUMENTS

2015/0184659 A1* 7/2015 Hoppach ............... F04C 11/008
                                                              417/423.3
2016/0208906 A1* 7/2016 Hechler ................. G04R 20/02

FOREIGN PATENT DOCUMENTS

| DE | 10 2008 054767 A1 | 6/2010 |
| DE | 10 2011 084 542 | 4/2013 |
| JP | 2012-159167 | 8/2012 |
| WO | WO 2005/001246 A1 | 1/2005 |
| WO | WO 2013/007247 A1 | 1/2013 |
| WO | WO 2013/053854 A1 | 4/2013 |

* cited by examiner

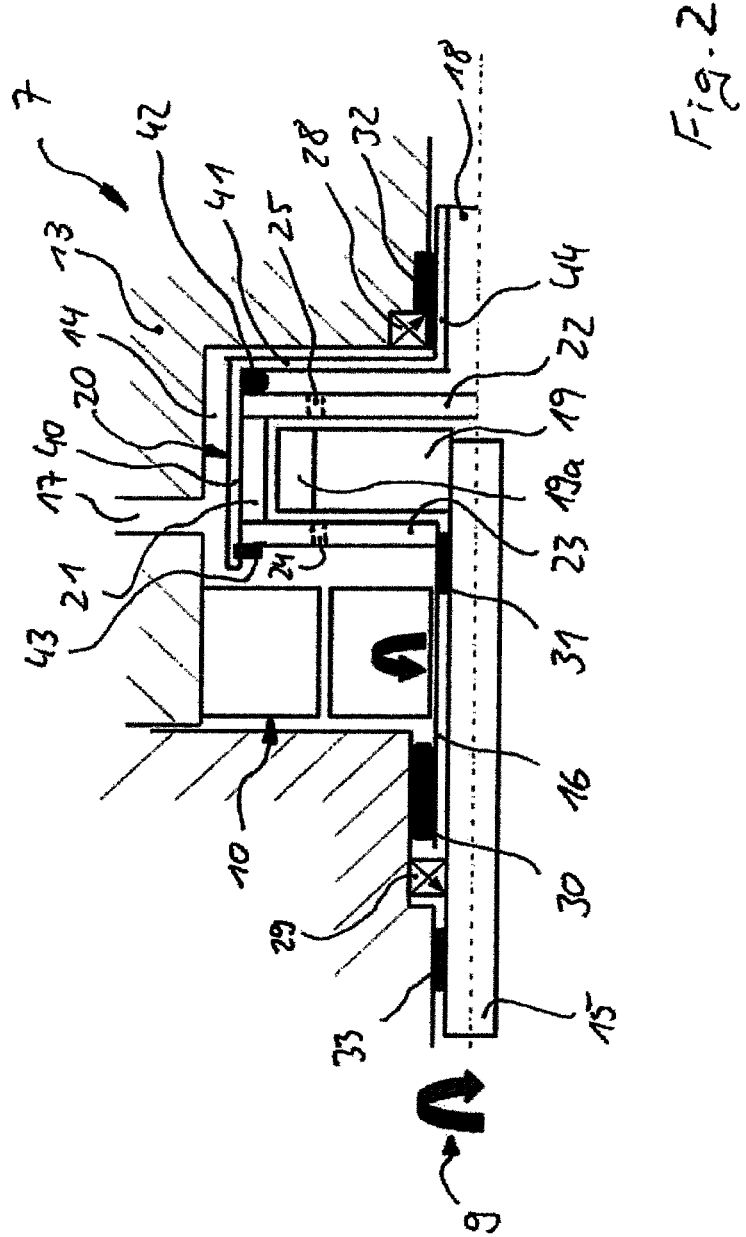

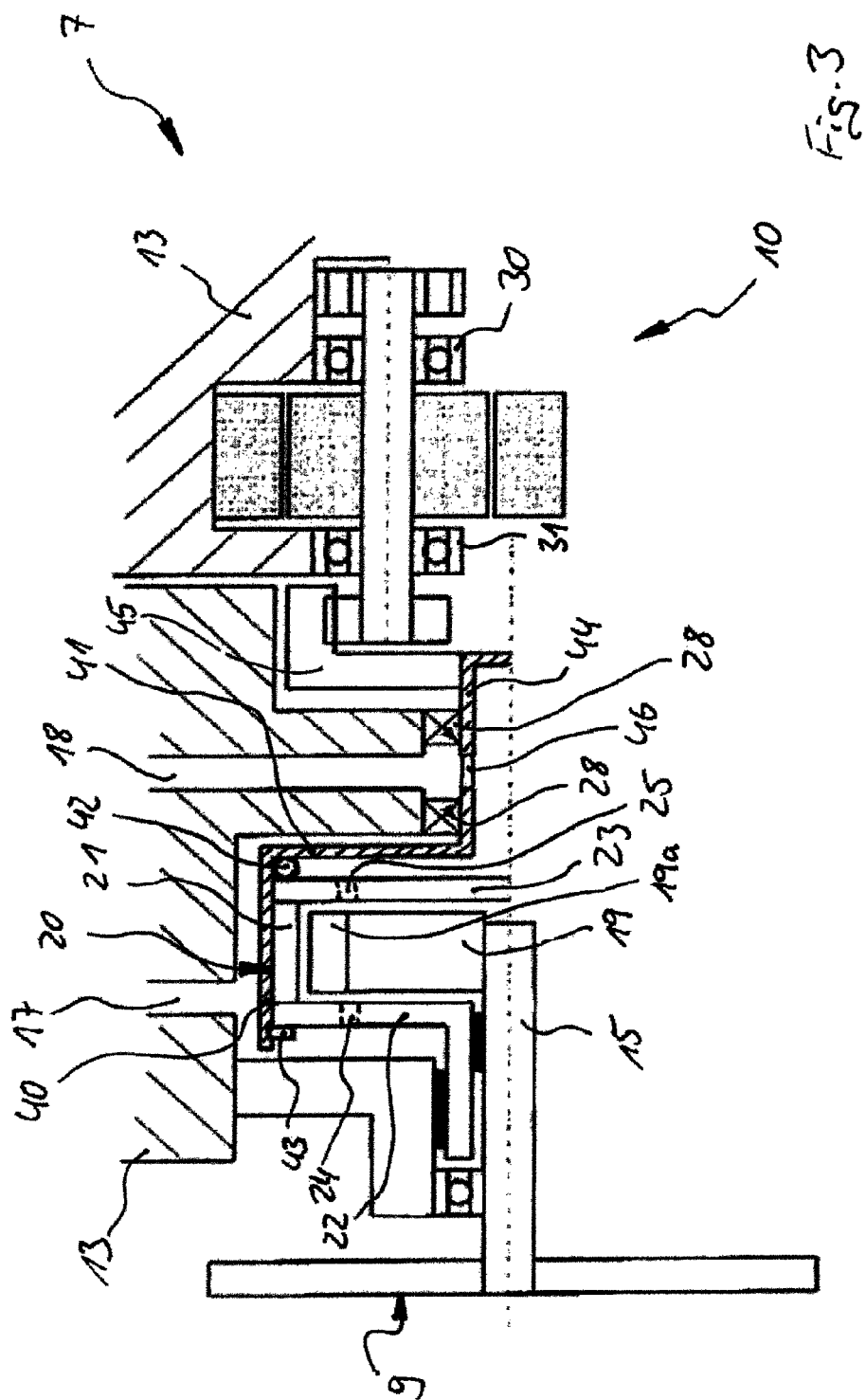

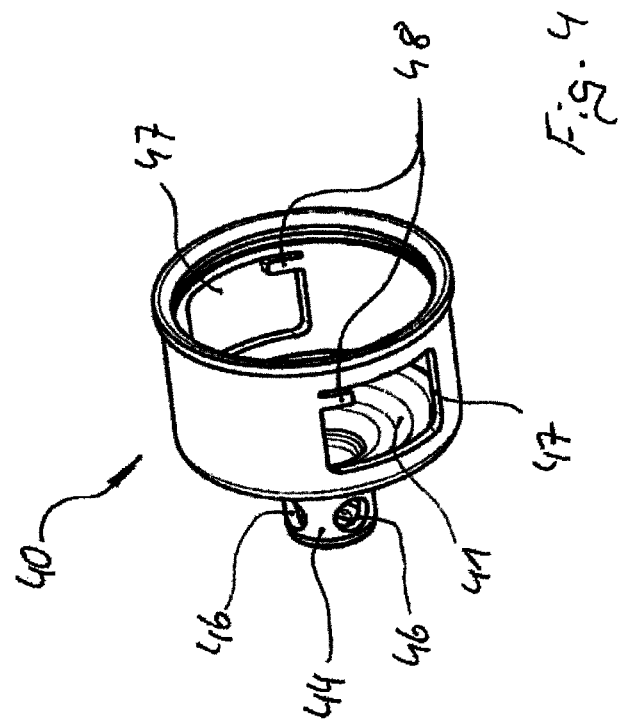

DELIVERY DEVICE FOR DELIVERING OIL FROM A RESERVOIR TO A TRANSMISSION OF A MOTOR VEHICLE

CROSS-REFERENCE TO RELATED APPLICATIONS

This is a U.S. national stage of application No. PCT/EP2014/061071, filed on 28 May 2014, which claims priority to the German Application No. DE 10 2013 211 428.1 filed 18 Jun. 2013 and German Application No. DE 10 2013 213 051.1 filed 4 Jul. 2013, the content of each of which incorporated herein by reference.

BACKGROUND OF THE INVENTION

1. Field of the Invention

The invention relates to a delivery device for delivering oil from a reservoir to a transmission of a motor vehicle.

2. Related Art

Such delivery devices are used in particular in motor vehicles with hybrid drive. In the case of such hybrid drives, the oil pump for providing a supply to a transmission is driven directly by the transmission. When the transmission is at a standstill, the function thereof should be maintained, and therefore the oil pump should remain in operation.

DE 10 2011 084 542 A1 disclosed a drive device for a transmission oil pump. Depending on the design of the components that are movable relative to one another, the oil pump may be a vane-type pump, a gearwheel pump or gerotor pump. The radially inner one of the components that are movable relative to one another is arranged rotationally conjointly on a shaft and can be driven by the direct drive. The pump stage housing is arranged rotationally conjointly on a hollow shaft and can be driven by the electric drive. For this purpose, the pump stage housing is arranged in a recess of the housing of the oil pump, wherein a seal is arranged between housing and pump stage housing. The seal is arranged such that oil is drawn in via an inlet in the housing and via an inlet duct in a control disk, and, after passing the components that are movable relative to one another, and after the associated pressure increase, the oil exits the oil pump via an outlet duct in the opposite control disk and the outlet in the housing. Disadvantages of this are firstly that the screw connection of the control disks to the ring is situated radially outside the components that are movable relative to one another, whereby the impeller part has a large outer diameter. Secondly, the pressure in the impeller part promotes the formation of an axial gap, which has an adverse effect on efficiency.

SUMMARY OF THE INVENTION

It is an object of the present invention to develop a delivery device having a smaller structural size while having improved efficiency.

In accordance with one aspect of the present invention, the delivery device having an oil pump that can be driven selectively by a mechanical direct drive or by an activatable electric drive and has two components movable relative to one another and serving to deliver the oil. The mechanical direct drive is connected to one of the components that are movable relative to one another, and the activatable electric drive is connected to the other of the components that are movable relative to one another, and wherein the components that are movable relative to one another are arranged in a pump stage housing composed of two control disks and an interposed ring. The pump stage housing is arranged in a pot-shaped component.

With the provision of a pot-shaped component for accommodating the pump stage housing, the pot-shaped component is the component that has to be adapted for arrangement in the housing of the oil pump. In this way, the pump stage housing can be of simpler design through the use of conventional components. The delivery device is thus made less expensive. Furthermore, the pot-shaped component permits simpler arrangement and fastening of the pump stage housing, such that the pump stage housing, and thus the oil pump, have smaller radial dimensions and thus take up less structural space. Owing to the smaller dimensions, use can be made of bearings and seals of smaller diameter, such that, as a result of lower friction values, efficiency is increased. Finally, the pot-shaped housing has the effect that the outer side of the outlet-side control disk is acted on with the generated pressure, which effects a reduction in size of the axial gap of the pump stage and likewise leads to an increase in efficiency.

Simple fastening of the pump stage housing is realized if the latter is clamped axially in the pot-shaped component.

Such fastening is advantageously realized by way of a circlip inserted on the inner side of the pot-shaped component and which thus axially clamps the pump stage housing.

In another refinement, an additional securing element for clamping purposes is eliminated by virtue of the open side of the pot-shaped component being flanged or calked for the purposes of axially clamping the pump stage housing.

In order for the outer side of the outlet-side control disk to be acted on with the generated pressure, the base of the pot-shaped component may have corresponding shaped elements, such as shoulders or inwardly directed channels, which generate a spacing between the base and pump stage housing. Such shaping of the base is avoided if the pump stage housing is clamped axially against the base of the pot-shaped housing via a sealing ring. This refinement further has the advantage that tolerance compensation is realized by the sealing ring.

The oil to be drawn in is fed from the inlet of the oil pump to the pump stage in a simple manner in that, in the shell surface of the pot-shaped component, there are arranged openings connected to the inlet ducts of the pump stage.

The rotational conjointness of the pump stage housing and the pot-shaped component can be further enhanced if, in the shell surface of the pot-shaped component, there are arranged tabs for engagement into the pump stage housing. Separate receptacles in the pump stage housing for the tabs are, in an advantageous refinement, avoided by virtue of the tabs engaging into the ducts of the pump stage housing.

In a further refinement, the base of the pot-shaped component transitions into a hollow shaft, the diameter of which is smaller than the shell surface of the pot-shaped component. The pot-shaped component can be mounted in the housing by way of the hollow shaft, wherein, owing to the small diameter, no additional structural space in a radial direction is required. The small dimensions furthermore have an advantageous effect on the weight and efficiency of the oil pump.

A particularly simple discharge of the delivered oil to the outlet in the housing is achieved by virtue of the hollow shaft having radially arranged openings.

For the delivery of the oil, the oil pump has two components that are movable relative to one another, wherein the mechanical direct drive is connected to one of the components that are movable relative to one another, and the activatable electric drive is connected to the other of the components that are movable relative to one another.

The delivery device according to an aspect of the invention also permits parallel operation of the direct drive and of the electric drive, for example if the electric drive is to be started early before the direct drive is deactivated. Likewise, the delivery power of the oil pump can be increased by activating the electric drive when the direct drive is running in an operating state with an excessively low rotational speed.

In another advantageous refinement of the invention, the oil pump is of structurally particularly simple design if the pot-shaped component is mounted so as to be rotatable relative to, and is sealed off by way of a radial seal with respect to, a static housing of the oil pump, and if inlet and outlet ports for the hydraulic connection of the oil pump are arranged on the housing.

The delivery device according to an aspect of the invention is of particularly compact design if the housing has a common recess for an electric motor of the electric drive and the pot-shaped component. In this way, the electric motor is cooled by the delivered oil, and the noise of the electric motor is dampened. Furthermore, in this way, the sealing of a shaft leadthrough for the electric drive can be dispensed with.

In another advantageous refinement of the invention, the electric drive can be protected against chemical or physical influences of the oil in a simple manner if the housing has a first recess for the impeller part and the rotor of the oil pump and a second recess for the electric motor of the electric drive.

In another advantageous refinement of the invention, a drive torque provided during the operation of the oil pump by the electric drive can be adjusted in a simple manner if the electric drive has a speed-reduction gearing.

The pot-shaped component could, for example, have, on the shell surface, an encircling toothed ring on which the respective drive is engaged. This however leads to large dimensions and thus to increased outlay in terms of construction for the oil pump. In another advantageous refinement of the invention, the oil pump is of particularly compact design if the rotor is fastened on a shaft of one drive, and the pot-shaped component is connected, in the region of the hollow shaft integrally formed the base, to the other drive. It is also possible, in a kinematic reversal, for the drives to be connected to the respective other part. The hollow shaft is preferably guided exclusively within the housing, such that the sealing of a shaft leadthrough is dispensed with.

In another advantageous refinement of the invention, the oil pump is composed of a particularly small number of components for assembly if the ring or the control plates have the oil supply elements.

In another advantageous refinement of the invention, mutual influencing of the drives can be avoided in a simple manner if the direct drive and the electric drive are of self-locking design.

In another advantageous refinement of the invention, the oil pump can be driven by two different drives in a particularly advantageous manner if the oil pump is in the form of a toothed ring pump, a vane-type pump or an external-gearwheel pump. In the case of such pump principles, the correspondingly designed rotor and a ring that surrounds the rotor interact such that, in a particularly simple manner, selectively the ring or the rotor can be driven for the purposes of delivering the oil.

BRIEF DESCRIPTION OF THE DRAWINGS

The invention permits the realization of numerous embodiments. For further illustration of the basic principle of the invention, several of these embodiments are illustrated in the drawings and will be described below. In the drawings:

FIG. 2 shows a first embodiment of the delivery device with two drives from FIG. 1;

FIG. 3 is a sectional illustration through a further embodiment of the oil pump; and FIG. 4 shows the pot-shaped part in a perspective illustration.

DETAILED DESCRIPTION OF THE PRESENTLY PREFERRED EMBODIMENTS

Figure 1:
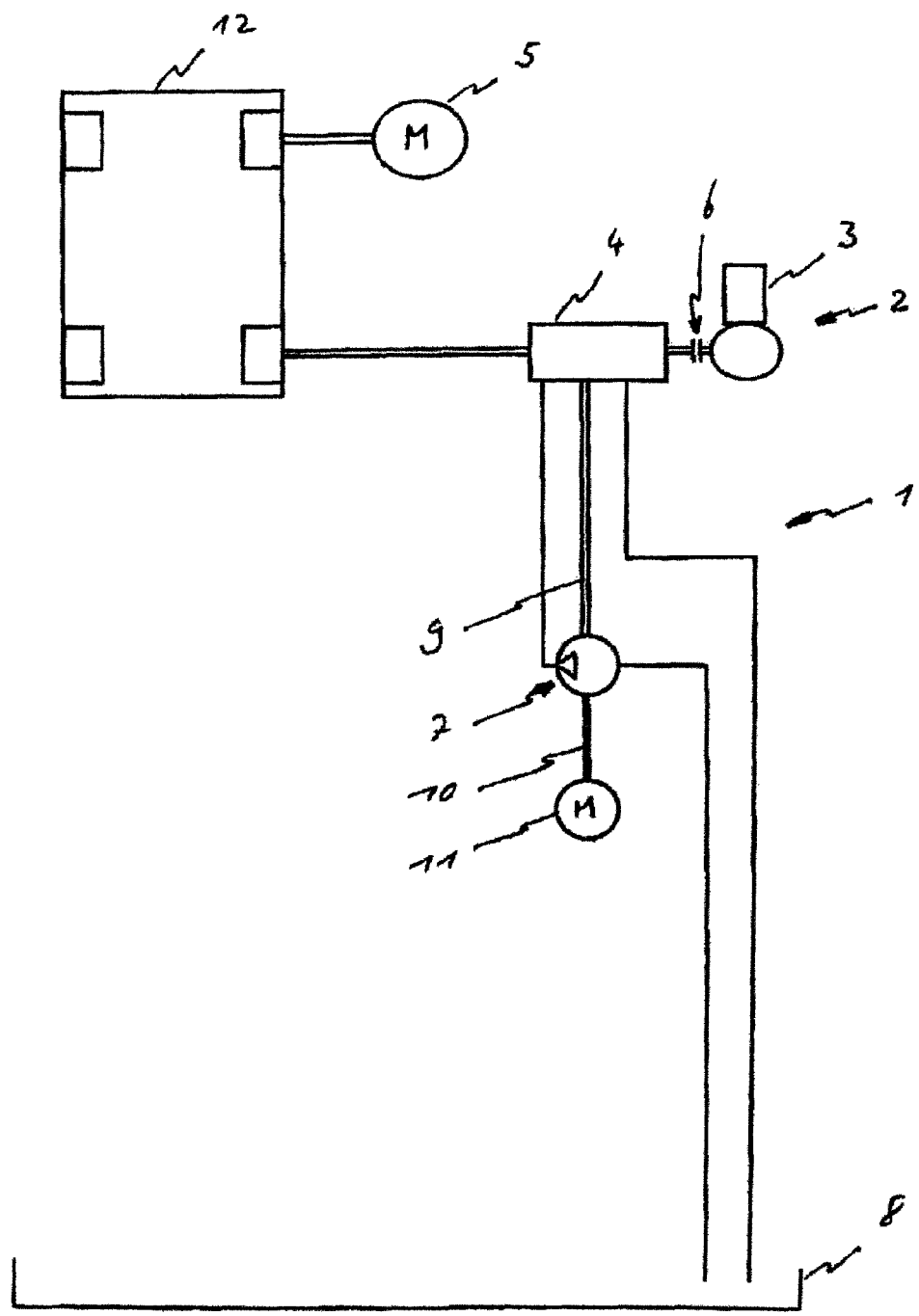
FIG. 1 schematically shows a delivery device according to the invention, with adjoining components of a motor vehicle.

FIG. 1 schematically shows a delivery device 1 with components of a hybrid drive 2 of a schematically illustrated motor vehicle 12. The hybrid drive 2 has an internal combustion engine 3, which drives the motor vehicle 12 via a transmission 4, and an electric drive unit 5 for driving the motor vehicle 12 independently of the transmission. A clutch separates the internal combustion engine 3 from the transmission 4. The delivery device 1 has an oil pump 7 for supplying oil to the transmission 4, and has a reservoir 8 in the form of an oil sump. Oil delivered by the oil pump 7 passes to the transmission 4 and from there back into the reservoir 8 again.

The transmission 4 has a direct drive 9 for driving the oil pump 7. Furthermore, an electric drive 10 with an electric motor 11 is connected to the oil pump 7. The oil pump 7 can thus be driven selectively by the electric drive 10 or by way of the direct drive 9. Parallel operation of the direct drive 9 and of the electric drive 10 is also conceivable, for example in order for the electric drive 10 to be brought up to speed early before the deactivation of the direct drive 9. In one operating mode of the motor vehicle 12, the electric drive unit 5 is activated and the internal combustion engine 3 is deactivated. In this case, the direct drive 9 of the transmission 4 is also deactivated. In this operating mode of the motor vehicle 12, the oil pump 7 is driven by the electric drive 10.

FIG. 2 shows a sectional illustration through the delivery device 1 with a sub-region of the oil pump 7, the electric drive 10, and the direct drive 9 from FIG. 1. Here, it can be seen that the oil pump 7 has a static housing 13 with a recess 14 for accommodating movable components of the oil pump 7 and of the electric motor 11 with the electric drive 10. The direct drive 9 has a shaft 15, which is introduced into the recess 14. The electric drive 10 has a hollow shaft 16, which is arranged entirely within the recess 14 of the housing 13 and which concentrically surrounds the shaft 15. The housing 13 further has an inlet port 17 and an outlet port 18 of the oil pump 7.

Components 19 and 19a of the oil pump 7 are movable relative to one another. One of the relatively movable components (19) of the oil pump 7 is fastened on the shaft 15. A pump stage housing 20, which is rotatable relative to the component 19, is fastened on the hollow shaft 16. The pump stage housing 20 has a ring 21, which radially surrounds the components 19, 19a, and control plates 22, 23, which face the face sides of the components 19, 19a, and also oil feed elements 24, 25 for the components 19, 19a. The oil feed elements 24, 25 are in the form of ducts and are arranged, for example, in the control plates 22, 23. As an alternative to this, with a correspondingly designed oil pump 7, the oil feed elements may be arranged in the ring 21, or may be distributed between ring 21 and control disk 22, 23. The pump stage housing 20 is arranged in a pot-shaped component 40. A sealing ring 42 is arranged between the base 41 of the pot-shaped component 40 and the outlet-side control disk 23. By way of a circlip 43, the pump stage housing 20 is clamped axially against the base 41 of the pot-shaped component 40. The base 41 transitions into a hollow shaft 44. Via this hollow shaft 44, the delivered oil flows to the outlet port of the oil pump 7. Radial seals 28, 29 seal off the shaft 15 and the hollow shaft 44 with respect to the housing 13. Multiple bearing arrangements 30-33 permit the rotatable mounting of the hollow shafts 16, 44 with respect to the housing 13 and with respect to the shaft 15. The direct drive 9 and the electric drive 10 are of self-locking design, such that the pot-shaped component 40 is immobilized when the electric drive 10 is deactivated and the component 19 is immobilized when the direct drive 9 is deactivated.

If the shaft 15 of the direct drive 9 is rotated, the component 19 is rotated relative to the pump stage housing 20. Here, oil is drawn in via the inlet port 17 and the inlet opening 26 and is delivered via the outlet opening 27 to the outlet port 18. If the hollow shaft 16 is rotated by the electric drive 10, it is exclusively the pump stage housing 20 with the oil feed elements 24, 25 that is rotated relative to the component 19. In this way, it is likewise the case that oil is drawn in via the inlet port 17 and delivered to the outlet port 18 in the housing 13.

FIG. 3 shows a further embodiment of the oil pump 7 with the direct drive 9, which is connected to the shaft 15, which in turn is connected to the component 19. The components 19, 19a are surrounded by the pump stage housing 20 with the control disks 22, 23 and with the ring 21. The pump stage housing 20 is arranged in the pot-shaped component 40 and is clamped axially against the base 41 via the sealing ring 42 by way of the circlip (not illustrated in FIG. 3). Integrally formed on the base 41 is the hollow shaft 44; that end of the hollow shaft which is averted from the base 41 has fastened to it a toothed ring 45, which is connected to the electric drive 10. The hollow shaft 44 has, between the base 41 and the toothed ring 45, radial openings 46 via which the oil can exit the housing 13 via the outlet 18.

FIG. 4 shows the pot-shaped component 40 with the base 41, the hollow shaft 44 and the radial openings 46. Openings 47 are likewise provided in the shell surface of the pot-shaped component 40, via which openings oil can be drawn in by the pump stage from the inlet port 17 via the ring 21. In the openings 47 there is arranged in each case one tab 48 which extending into the respective opening, which tabs, by being bent radially inward, connect the pot-shaped part 40 rotationally conjointly to the pump stage housing 20.

The connection of the delivery device 1 to the hybrid drive 2 is to be understood merely as an example. The delivery device 1 is likewise suitable for motor vehicles 12 that are driven exclusively by the internal combustion engine 3.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A delivery device (1) for delivering oil from a reservoir (8) to a transmission (4) of a motor vehicle (12), comprising:
    an oil pump (7) selectively drivable by a mechanical direct drive (9) or by an activatable electric drive (10), the oil pump (7) having:
        first and second components (19, 19a), the first and second components being movable relative to one another and being configured to deliver the oil, the mechanical direct drive (9) being connected to one of the first and second components (19, 19a), and the activatable electric drive (10) being connected to the other of the first and second components (19, 19a);
        a pump stage housing (20), in which the first and second components (19, 19a) are arranged, the pump stage housing (20) having two control disks (22, 23) and an interposed ring (21); and
    a pot-shaped component (40) in which the pump stage housing (20) is arranged.

2. The delivery device as claimed in claim 1, wherein the pump stage housing (20) is clamped axially in the pot-shaped component (40).

3. The delivery device as claimed in claim 2, wherein the pump stage housing (20) is clamped axially by a circlip (43) inserted on an inner side of the pot-shaped component (40).

4. The delivery device as claimed in claim 2, wherein the pot-shaped component (40) has an open side, the open side of the pot-shaped component (40) being flanged or calked to axially clamp the pump stage housing (20).

5. The delivery device as claimed in claim 1, wherein the pot-shaped housing (40) has a base (41), the pump stage housing (20) being clamped axially against the base (41) of the pot-shaped housing (40) via a sealing ring (42).

6. The delivery device as claimed in claim 5, wherein the pot-shaped housing (40) has a shell surface, the shell surface of the pot-shaped component (40) having openings (47) arranged therein, which openings (47) are connected to oil feed elements (24, 25) of the pump stage housing (20).

7. The delivery device as claimed in claim 6, further comprising tabs (48) arranged in the shell surface of the pot-shaped component (40), the tabs (48) being configured to provide rotationally conjoint clamping of the pump stage housing (20) to the pot-shaped component (40).

8. The delivery device as claimed in claim 6, wherein the base (41) of the pot-shaped component (40) transitions into a hollow shaft (44), the diameter of the hollow shaft (44) being smaller than the diameter of the shell surface of the pot-shaped component (40).

9. The delivery device as claimed in claim 8, wherein the hollow shaft (44) has radially arranged openings (46).

10. The delivery device as claimed in claim 1, further comprising a static housing (13), wherein the pot-shaped component (40) is mounted so as to be rotatable relative to, and is sealed off by way of a radial seal (28) with respect to, the static housing (13), and inlet and outlet ports (17, 18) for hydraulic connection of the oil pump (7) are arranged on the static housing (13).

11. The delivery device as claimed in claim 10, wherein the static housing (13) has a common recess (14) for an electric motor (11) of the electric drive (10) and the pot-shaped component (40).

12. The delivery device as claimed in claim 10, wherein the static housing (13) has a first recess for the pot-shaped housing (40) and a second recess for the electric motor of the electric drive (10).

13. The delivery device as claimed in claim 1, wherein the electric drive (10) has a speed-reduction gearing.

14. The delivery device as claimed in claim 1, wherein the first component (19) is fastened on a shaft (15), and the pot-shaped housing (40) is connected to a hollow shaft (16) arranged concentrically with respect to the shaft (15).

15. The delivery device as claimed in claim 1, wherein inlet and outlet openings (26, 27) are arranged on the pump stage housing (20).

16. The delivery device as claimed in claim 15, wherein at least one of the inlet and outlet openings (26, 27) is arranged on the control disks (22, 23) of the pump stage housing (20).

17. The delivery device as claimed in claim 15, wherein at least one of the inlet and outlet openings (26, 27) is arranged on the interposed ring (21) of the pump stage housing (20).

18. The delivery device as claimed in claim 1, wherein the direct drive (9) and the electric drive (10) are of self-locking design.

19. The delivery device as claimed in claim 1, wherein the oil pump (7) is a toothed ring pump, a vane-type pump or an external-gearwheel pump.

\* \* \* \* \*